(12) United States Patent  (10) Patent No.: US 8,785,026 B2
Hu et al.  (45) Date of Patent: Jul. 22, 2014

(54) PROTECTION STRUCTURE FOR THERMAL DISSIPATION AND PREVENTING THERMAL RUNAWAY DIFFUSION IN BATTERY SYSTEM

(75) Inventors: Hsien-Lin Hu, Hsinchu County (TW); Jenn-Dong Hwang, Hsinchu (TW); Cheng-Chou Wong, Hsinchu County (TW); Chin-Chuan Chang, Taipei County (TW); Sheng-Fa Yeh, Miaoli County (TW); Bing-Ming Lin, Hsinchu (TW); Yu-Min Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 854 days.

(21) Appl. No.: 12/967,002

(22) Filed: Dec. 13, 2010

(65) Prior Publication Data

US 2011/0159340 A1  Jun. 30, 2011

(30) Foreign Application Priority Data

Dec. 25, 2009  (TW) ............................... 98145069 A

(51) Int. Cl.
  *H01M 10/50*  (2006.01)
(52) U.S. Cl.
  USPC .......................................... 429/120; 429/121
(58) Field of Classification Search
  USPC ................................................. 429/120, 121
  See application file for complete search history.

(56) References Cited

U.S. PATENT DOCUMENTS 4,054,990 A * 10/1977 Borjesson ..................... 29/623.1
5,626,982 A * 5/1997 Kawai et al. .................. 429/120
6,468,689 B1 10/2002 Hallaj et al.
6,942,944 B2 9/2005 Al-Hallaj et al.
2005/0255379 A1 11/2005 Marchio et al.
2006/0073377 A1 4/2006 Al-Hallaj et al.
2009/0004556 A1 1/2009 Al-Hallaj et al.
2009/0191453 A1* 7/2009 Fujii et al. ..................... 429/120
2010/0136404 A1* 6/2010 Hermann et al. ............. 429/120
2011/0159339 A1* 6/2011 Gregor et al. ................. 429/120

FOREIGN PATENT DOCUMENTS

CN  101312240  11/2008
JP  2009123371  6/2009
WO  2009011749  1/2009

OTHER PUBLICATIONS

"First Office Action of China counterpart application" issued on Aug. 23, 2012, p. 1-p. 8.
"Office Action of Taiwan Counterpart Application", issued on Oct. 21, 2013, p. 1-p. 4.
Gi-Neon Kim, "Thermal Abuse Modeling of Li-ion Cells and Propagation in Module," which is published in the 4th International Symposium of Large Lithium Ion Battery Technology and Applications (LLIBTA) held in May, 2008.

* cited by examiner

*Primary Examiner* — Mark F Huff
*Assistant Examiner* — Monique Wills
(74) *Attorney, Agent, or Firm* — Jianq Chyun IP Office

(57) ABSTRACT

A protection structure for preventing thermal dissipation and thermal runaway diffusion in battery system is provided. The protection structure includes a battery module casing and at least one composite heat conduction plate. There is a plurality of unit cells disposed in the battery module casing. The composite heat conduction plate is located within the battery module casing, contacted with the battery module casing, and sandwiched between at least two of the unit cells as a heat transmission medium between the cells and the casing to control heat transmission among the cells. The composite heat conduction plate is a multilayer anisotropic heat conduction structure constituted by at least one heat conduction layer and at least one heat insulation layer.

32 Claims, 11 Drawing Sheets

PROTECTION STRUCTURE FOR THERMAL DISSIPATION AND PREVENTING THERMAL RUNAWAY DIFFUSION IN BATTERY SYSTEM

CROSS-REFERENCE TO RELATED APPLICATION

This application claims the priority benefit of Taiwan application serial no. 98145069, filed on Dec. 25, 2009. The entirety of the above-mentioned patent application is hereby incorporated by reference herein and made a part of this specification.

TECHNICAL FIELD

The disclosure relates to a protection structure for thermal dissipation and preventing thermal runaway diffusion in a battery system.

BACKGROUND

As the decreased amount and the elevated price of gasoline have become a global issue, electric vehicles are the best solution for solving this problem. In the state of California of the United States of America, legislations are passed for forcing car dealers to sell a specific ratio of electric vehicles, where the other states will soon follow. France, Germany, Switzerland and Japan all have policies for rewarding the use or technical research of electric vehicles. Moreover, practical electric vehicles have been developed and gradually introduced in experimental trials.

Advanced countries such as the United States of America, Japan, and countries in Europe all pay high attention to the air pollution caused by urban transportation and the decrease in the amount of gasoline. Moreover, it is currently agreed to be a good time for developing the adoption of electric vehicles and putting more effort in the research and promotion of electric vehicles. In the state of California of the U.S., legislations are passed for forcing car dealers to sell a specific ratio of electric vehicles, where the other states will soon follow. France, Germany, Switzerland and Japan all have policies for rewarding the use or technical research of electric vehicles. Moreover, practical electric vehicles have been developed and gradually introduced in experimental trials. Here, lithium battery directing is the key to the successful development of electric vehicles. This is due to the fact that a lithium battery only weighs half of a nickel-hydrogen battery, but has an endurance two times longer than that of a nickel-hydrogen battery. Moreover, the lithium battery has high working voltage, high energy density, long life-span, and is environmental friendly. In addition, waste gas will not be exhausted when the lithium battery is applied in vehicles, such that not only is energy saved and carbon level reduced, but the amount of gasoline used is also reduced. The replacement of ordinary batteries with chargeable lithium batteries is a major trend for vehicle manufacturers in the future.

The global retrieval of lithium batteries in SONY notebook computers in 2006 brings out the thermal runaway safety problem of lithium batteries. The battery module used in a notebook computer is constituted by only 3 to 8 18650 unit cells. If an electric vehicle is powered by 18650 unit cells, 4000 to 6000 batteries would be required to provide sufficient power (dynamics) and capacitance (endurance). The increase in the number of batteries increases the chance of thermal runaway, and the thermal runaway in one of the batteries in the battery module may diffuse to the entire battery module. Once thermal runaway occurs in one of the batteries in the battery module, the battery cannot be controlled effectively and the thermal runaway diffuses gradually from the closest battery, such that thermal runaway occurs in the entire battery module, which is as dangerous as a small explosion.

Thus, the National Renewable Energy Laboratory (NREL) in the U.S.A. has recently performed a series of researches in the thermal runaway diffusion of the lithium battery module. The thermal runaway diffusion occurs when one of the batteries in the battery module releases heat abnormally due to short-circuit or uneven electricity (low volume or high internal resistance) in the charging/discharging process. Once the battery exceeds a threshold temperature for the thermal runaway reaction (usually about 150° C.), the material in the battery gradually goes through the thermal decomposition exothermic reaction. The so-called thermal decomposition exothermic reaction is a self-heating autocatalytic reaction, where the temperature of the battery is increased rapidly. When the thermal runaway occurs, the temperature of the battery can exceed 500° C. and the self-heating temperature increase is more than 20° C. per minute. Therefore, after exceeding the threshold thermal runaway temperature, the battery increases its temperature rapidly so as to result in thermal runaway. The thermal energy released from the thermal runaway of this battery then heats up the neighboring batteries if good insulation and heat dissipation structures were not designed. For example, as shown in the left diagram in page 30 of "Thermal Abuse Modeling of Li-ion Cells and Propagation in Module," which is published in the 4th International Symposium of Large Lithium Ion Battery Technology and Applications (LLIBTA) held in May, 2008, the battery with thermal runaway causes the neighboring batteries to result in thermal runaway. As the thermal runaway inside the battery module reaches this stage, the thermal runaway cannot be controlled effectively, such that all of the other batteries in the entire battery module will all result in thermal runaway so as to generate combustion exothermic reactions. This process is usually followed by the release of large amounts of flammable electrolyte gas and battery material decomposition gas and more severely, possible explosions.

The thermal runaway safety problem of lithium batteries is mainly caused by overcharging and short-circuit. However, thermal runaway can also occur when the battery is punctured from an external impact. The thermal runaway of a battery is basically the reaction process of a battery internal material releasing heat under thermal degradation.

Currently, the control of thermal runaway diffusion has been disclosed in U.S. Pat. No. 6,942,944, U.S. Patent Application Publications No. US20060073377 and No. US20090004556. The above research teams are members involved in the research of battery thermal runaway in the NREL. In these disclosures, a phase change material is filled to spaces between the batteries, and the heat generated during the thermal runaway is absorbed using the heat absorbing property of the phase change process of the phase change material.

However, the above patents has a flaw; that is, the thermal conductivity of the phase change material is poor. The property can be used to insulate the heat transmission between the batteries during the thermal runaway. As the heat conductivity of the phase change material is poor, although the temperature increase of the battery module can be controlled during normal usage, the subsequent cooling rate requires longer time. For instance, in FIG. 9 of U.S. Pat. No. 6,942,944, it shows that after the battery module discharges, the battery module has to be placed still for almost 24 hours under a natural convention current for heat dissipation (without additional fans for heat dissipation) to return to the temperature before the discharging. The low thermal conductivity and heat absorbing property of the phase change material can be used to insulate the thermal runaway diffusion inside the battery module and reduce the temperature increase during charging/discharging. Nevertheless, the phase change material is unfavorable for its long cooling time, which is disadvantageous for the continuous charging/discharging of the battery module.

SUMMARY

A protection structure for thermal dissipation and preventing thermal runaway diffusion in a battery system is introduced herein so as to provide safety protection of thermal runaway of the entire battery module caused by the diffusion of thermal runaway of one of the unit cells in the battery system. The disclosure has a heat conduction/dissipation function and can solve the uneven battery temperature and overheat inside the battery module so as to extend the cycle life of the lithium battery module.

A protection structure for thermal dissipation and preventing thermal runaway diffusion in a battery system is introduced herein. The protection structure includes a battery module casing and at least one composite heat conduction plate. A plurality of unit cells is disposed in the battery module casing. The composite heat conduction plate is located within the battery module casing, contacted with the battery module casing, and sandwiched between at least two of the unit cells as a heat transmission medium between the cells and the casing to control heat transmission among the cells. The composite heat conduction plate is a multilayer anisotropic heat conduction structure constituted by at least one heat conduction layer and at least one heat insulation layer.

A protection structure for thermal dissipation and preventing thermal runaway diffusion in a battery system is further introduced herein. The protection structure includes a battery pack casing and at least one composite heat conduction plate. A plurality of battery modules is disposed in the battery pack casing. The composite heat conduction plate is located within the battery pack casing, contacted with the battery pack casing, and sandwiched between at least two of the battery modules. The composite heat conduction plate is a multilayer anisotropic heat conduction structure constituted by at least one heat conduction layer and at least one heat insulation layer.

In light of the foregoing, the composite heat conduction plate constituted by alternately disposed heat conduction layers and heat insulation layers is disposed between unit cells and/or battery modules. Therefore, when any one of the unit cells in the battery module releases heat abnormally due to short-circuit, overcharging, or other reasons, the unit cell may then result in thermal runaway. The heat diffusion from the unit cell to the neighboring unit cells can be effectively insulated by the heat insulation layer in the composite heat conduction plate. Moreover, the heat conduction layer in the composite heat conduction plate conducts heat to the casing for thermal dissipation, such that the thermal runaway of the unit cell is controlled within that single unit cell or between the limited number of unit cells. The thermal runaway of the entire battery module or the battery system possible threatening the safety of the user is thus prevented. In addition, for some battery modules having control circuit boards disposed in the battery module casing, the composite heat conduction plate of the disclosure can be disposed between the battery and the circuit board and between battery and the connecting circuit to reduce the battery heating problem caused by the circuit board and the circuit.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In a battery system, a lithium battery for cars is generally constituted by a plurality of unit cells connected in parallel or in series, for example, to provide sufficient voltage and capacitance. In consideration of usable space, the unit cells are tightly aligned in a battery module casing and a battery pack is constituted by a plurality of battery modules. In the long period of charging and discharging, the unit cells in the battery module encounter short-circuit, increase in internal resistance, and difference in volume deterioration, such that these abnormal batteries are overheated. In an environment with the neighboring unit cells releasing heat continuously, the temperature of the abnormal unit cell is more likely to exceed its thermal runaway threshold temperature and this unit cell then results in thermal runaway. In the thermal runaway process, the unit cell releases more heat due to the thermal decomposition of internal material. The heat is transmitted to the neighboring batteries that are stacked together, so that the neighboring batteries also undergo thermal runaway in series.

The disclosure adopts an anisotropic heat conduction design so as to carry out heat conduction and thermal dissipation to the heat of the battery with directionality and insulate the heat of thermal runaway from transmitting to the neighboring unit cells. Consequently, thermal runaway is prevented from occurring to the entire battery module and the safety of the battery module is enhanced.

Figure 1:
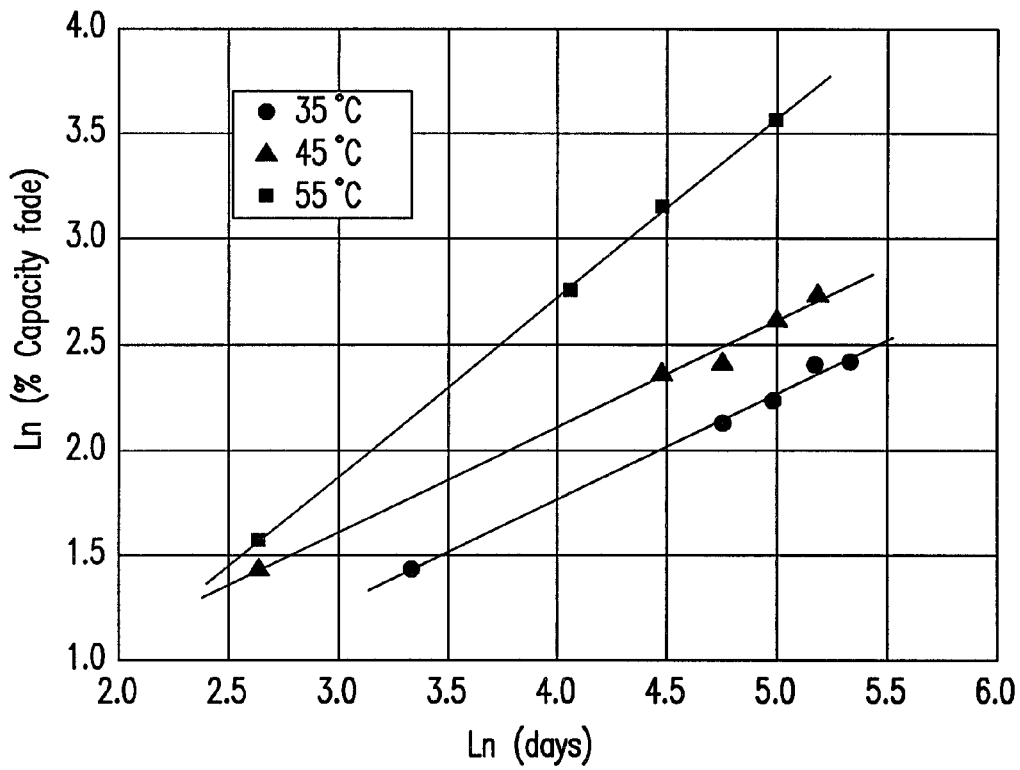
FIG. 1 is a curve diagram of battery volume versus cycle life of a unit cell under different temperatures.

Also, the structure in the disclosure can be used as a heat dissipation structure of the battery module to decrease an internal temperature of the battery module and reduce an internal temperature gradient of the battery module so as to extend a cycle life of the battery module. The relationship of the temperature of the battery versus the life-span of the battery (capacity fade) is shown in FIG. 1. The temperature and heat dissipation of the battery module have significant effects to the cycle life of the battery module. Other than the role in the safety protection of thermal runaway diffusion, the disclosure can also function in heat dissipation of the battery.

Figure 2:
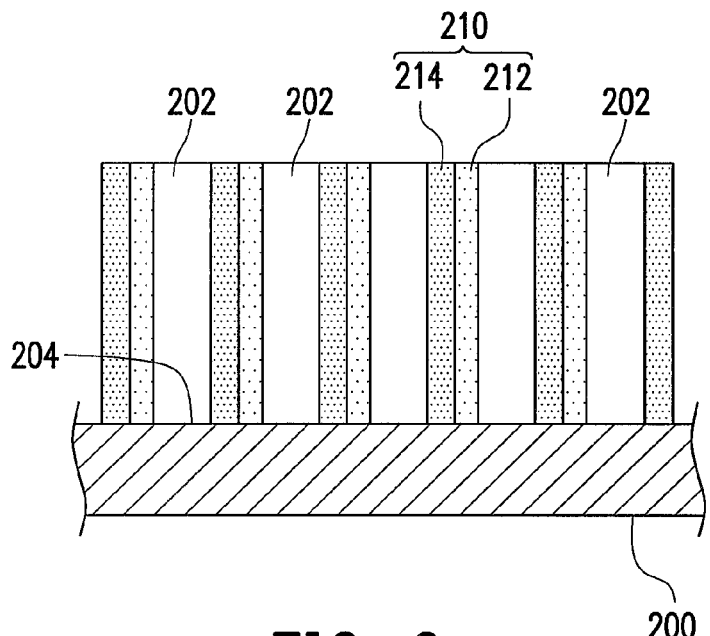
FIG. 2 is a cross-sectional diagram illustrating a protection structure for thermal dissipation and preventing thermal runaway diffusion in a battery system according to a first exemplary embodiment.

A first exemplary embodiment directing to a protection structure for thermal dissipation and preventing thermal runaway diffusion in a battery system (as shown in FIG. 2) to insulate the thermal runaway diffusion of the battery and provide the heat dissipation of the battery module is illustrated in the following according to the disclosure.

Referring to FIG. 2, a protection structure for thermal dissipation and preventing thermal runaway diffusion in the present exemplary embodiment includes a battery module casing 200 and a plurality of composite heat conduction plates 210. A plurality of unit cells 202 is normally disposed in the battery module casing 200. For the simplicity of the drawing, only a portion of the battery module casing 200 is depicted herein. The composite heat conduction plates 210 are located in the battery module casing 200, contacted with the battery module casing 200 and sandwiched between at least two of the unit cells 202. In FIG. 2, each of the composite heat conduction plates 210 is sandwiched between two of the unit cells 202. The composite heat conduction plate 210 is a double layer anisotropic heat conduction structure constituted by a heat conduction layer 212 and a heat insulation layer 214. Moreover, the composite heat conduction plates 210 can be disposed with more than two unit cells 202 in-between. Or, the composite heat conduction plate 210 can be a triple layer structure or a multilayer structure having a plurality of heat conduction layers and a plurality of heat insulation layers disposed alternately. That is, the structure of the composite heat conduction plates 210 is not limited to the first exemplary embodiment.

Referring to FIG. 2, the total thickness of the composite heat conduction plates 210 and the respective thicknesses of the heat conduction layer 212 and the heat insulation layer 214 can be determined depending on the application field or the thermal conductivity coefficient thereof. For example, when the total thickness of the composite heat conduction plates 210 ranges from 2.0 cm to 0.05 cm, the thickness of the heat conduction layer 212 occupies about 3% to 70% of the total thickness and the thickness of the heat insulation layer 214 occupies about 30% to 97% of the total thickness. In another exemplary embodiment, when the total thickness of the composite heat conduction plates 210 ranges from 1.0 cm to 0.05 cm, the thickness of the heat conduction layer 212 occupies about 5% to 70% of the total thickness and the thickness of the heat insulation layer 214 occupies about 30% to 95% of the total thickness. In another exemplary embodiment, when the total thickness of the composite heat conduction plates 210 ranges from 0.5 cm to 0.05 cm, the thickness of the heat conduction layer 212 occupies about 10% to 70% of the total thickness and the thickness of the heat insulation layer 214 occupies about 30% to 90% of the total thickness.

In the present exemplary embodiment, a thermal conductivity coefficient k of the heat conduction layer 212 is at least 50 W/m·K. For instance, when a thermal conductivity coefficient k of the heat conduction layer 212 ranges from 50 W/m·K to 100 W/m·K, a material of the heat conduction layer 212 includes, for example, nickel, nickel alloy, metal, steel, carbon material or composite material having one of the above materials mixed with a plastic material. When the thermal conductivity coefficient k of the heat conduction layer 212 ranges from 100 W/m·K to 450 W/m·K, a material of the heat conduction layer 212 includes gold, silver, aluminum, aluminum alloy, copper, copper alloy, magnesium, magnesium alloy, metal oxide, or a composite material having one of the above materials mixed with a plastic material. Alternatively, a material of the heat conduction layer 212 can be a composite material having a plastic material mixed with high heat conduction ceramic powder such as carbon nitride, silicon nitride, and the like. Table 1 shows a list of materials which can be adopted to fabricate the heat conduction layer 212 and the thermal conductivity coefficients k thereof.

TABLE 1

| | k (W/m · K) |
|---|---|
| Pure metal | |
| silver | 418 |
| gold | 318 |
| copper | 386 |
| nickel | 99 |
| aluminum | 220 |
| iron | 71.8 |
| magnesium | 171 |
| zinc | 112.2 |
| Alloy | |
| aluminum alloy | 100-190 |
| steel | 50-100 |
| magnesium aluminum alloy | 50-70 |
| copper alloy | 60-400 |
| composite material | |
| graphite composite material | 100-450 |
| metal polymer composite material such as aluminum, copper, magnesium, and the like | 50-150 |
| ceramic polymer composite material such as carbon nitride, silicon nitride, and the like | 50-100 |

In the present exemplary embodiment, a thermal conductivity coefficient k of the heat induction layer 214 is at most 2 W/m·K. For example, when a thermal conductivity coefficient k of the heat insulation layer 214 ranges from 0.05 W/m·K to 2 W/m·K, a material of the heat insulation layer 214 includes, for example, asbestos, a glass fiber-reinforced resin plate or a plastic plate. The plastic plate is fabricated with polyethelyne (PE), ethylene vinyl acetate (EVA), polypropylene (PP), alkybenzoyl sulfonate (ABS), epoxy, or polyvinyl chloride (PVC), for instance. When a thermal conductivity coefficient k of the heat insulation layer 214 ranges from 0.001 W/m·K to 0.5 W/m·K, the heat insulation layer 214 is a foaming polymer material, a low melting point polymer material, a liquid, or air. The low melting point polymer material is a polymer material having a melting point ranging from 40° C. to 80° C. The above foaming polymer material is PE, PP, ABS, epoxy, or PVC. The above low melting point polymer material includes natural or artificial synthesized petrolatum or fatty acids. The liquid is water or silicone oil. Table 2 shows a list of materials which can be adopted to fabricate the heat insulation layer 214 and the thermal conductivity coefficients k thereof.

TABLE 2

| Material | kz (W/m · K) |
|---|---|
| PE | 0.42-0.51 |
| epoxy | ~0.35 |
| ABS | 0.18-0.34 |
| Polytetrafluoroethylene (PTFE) | ~0.25 |
| vinyl ester | ~0.25 |
| phenolic resin (also referred as bakelite) | ~0.22 |
| acrylic resin | ~0.2 |
| PVC | ~0.19 |
| PP | 0.1-0.22 |
| fiber insulating board (Fiber insulating board) | ~0.048 |
| polystyrene expanded (Polystyrene expanded) | ~0.03 |
| Styrofoam ™ | ~0.033 |
| phenolic resin foam (phenolic resin foam) | ~0.022 |
| silica aerogel (Silica aerogel) | ~0.003 |
| water | ~0.58 |
| acetone | ~0.16 |
| silicone oil | ~0.1 |
| petrolatum | 0.1-0.25 |
| fatty acids | 0.1-0.35 |

When one of the unit cells 202 in FIG. 2 undergoes thermal runaway due to short-circuit or overcharging, such that when the internal material thermal decomposes to release a large amount of heat, the unit cell 202 can conduct heat to the battery module casing 200 from the heat conduction layer 212 in the composite heat conduction plate 210 via a contact surface 204. At this time, the heat is effectively insulated by the heat insulation layer 214.

Figure 3A:
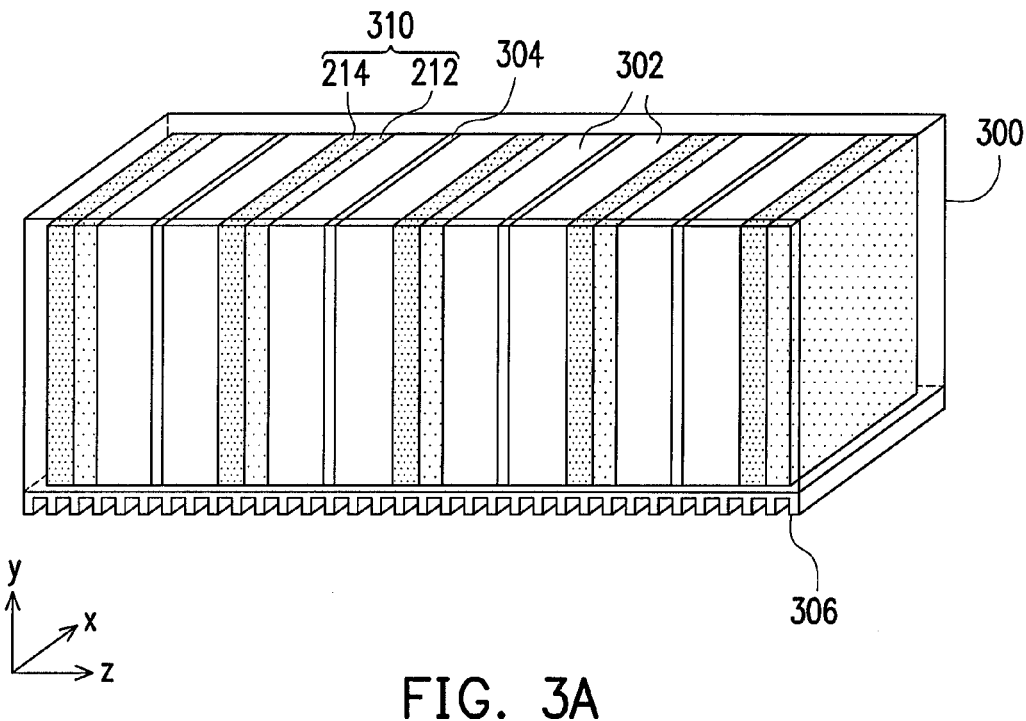
FIGS. 3A and 3B are three-dimensional (3D) diagrams respectively illustrating a protection structure for thermal dissipation and preventing thermal runaway diffusion in a battery system according to a second exemplary embodiment.
Figure 3B:
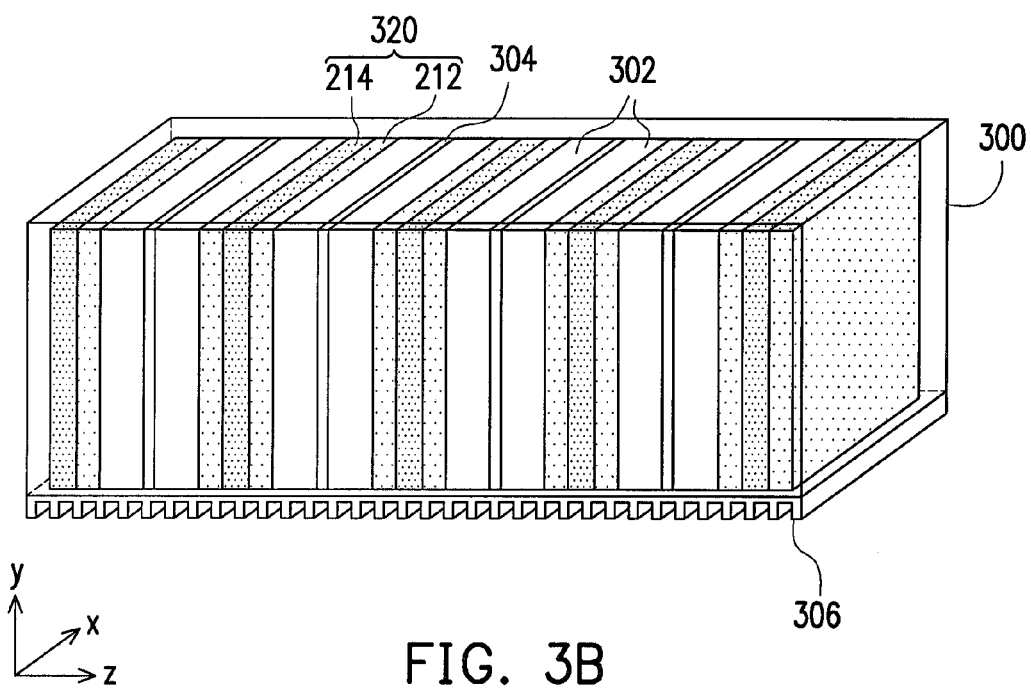

FIGS. 3A and 3B are three-dimensional (3D) diagrams respectively illustrating a protection structure for thermal dissipation and preventing thermal runaway diffusion in a battery system according to a second exemplary embodiment.

Referring to FIG. 3A, the thermal runaway diffusion structure includes a battery module casing 300 and a plurality of composite heat conduction plates 310. A plurality of unit cells 302 in the battery module casing 300 has a shape of flat plate. Each side of each composite heat conduction plate 310 includes two unit cells 302. The two unit cells 302 have a partition 304 therebetween. Each partition 304 is fabricated with a heat conduction material such as metal aluminum, aluminum alloy, copper, copper alloy, or graphite. Other than the two unit cells 302 in FIG. 3A, the number of unit cells neighboring to the two composite heat conduction plates 310 can also be changed depending on the size of the unit cells 302. However, the number of unit cells is preferably smaller than 3. In the second exemplary embodiment, the composite heat conduction plates 310 are similar to those in the first exemplary embodiment. That is, each of the composite heat conduction plates 310 is a double layer anisotropic heat conduction structure constituted by a heat conduction layer 212 and a heat insulation layer 214. Thus, the materials and thicknesses of the heat conduction layer 212 and the heat insulation layer 214 can both be referred to the first exemplary embodiment. In addition, in the present exemplary embodiment, the battery module casing 200 can includes a heat dissipation fin 306. The heat dissipation fin 306 can be connected to the composite heat conduction plate 310 through physical contact (interface coated with heat conduction grease), bonding (with solder paste or heat conduction glue), or soldering.

Referring to FIG. 3B, the composite heat conduction plate 310 in FIG. 3A is changed into a composite heat conduction plate 320. The composite heat conduction plate 320 is a triple layer anisotropic heat conduction structure constituted by a layer of the heat insulation layer 214 sandwiched between two layers of the heat conduction layer 212. Here, as one side of the two unit cells 302 in FIG. 3B has already contacted with the composite heat conduction plate 320, the partition 304 disposed therebetween can be fabricated with a heat insulation material such phenolic resin, ABS, epoxy, or PVC, other than heat conduction material, for better thermal runaway diffusion insulation. The fabrication of the composite heat conduction plate 320 is performed by adhering a layer of the heat insulation layer 214 to two layers of the heat conduction layer 212. Alternatively, a layer of the heat conduction layer 212 is coated on each side of a layer of the heat insulation layer 214.

Figure 4:
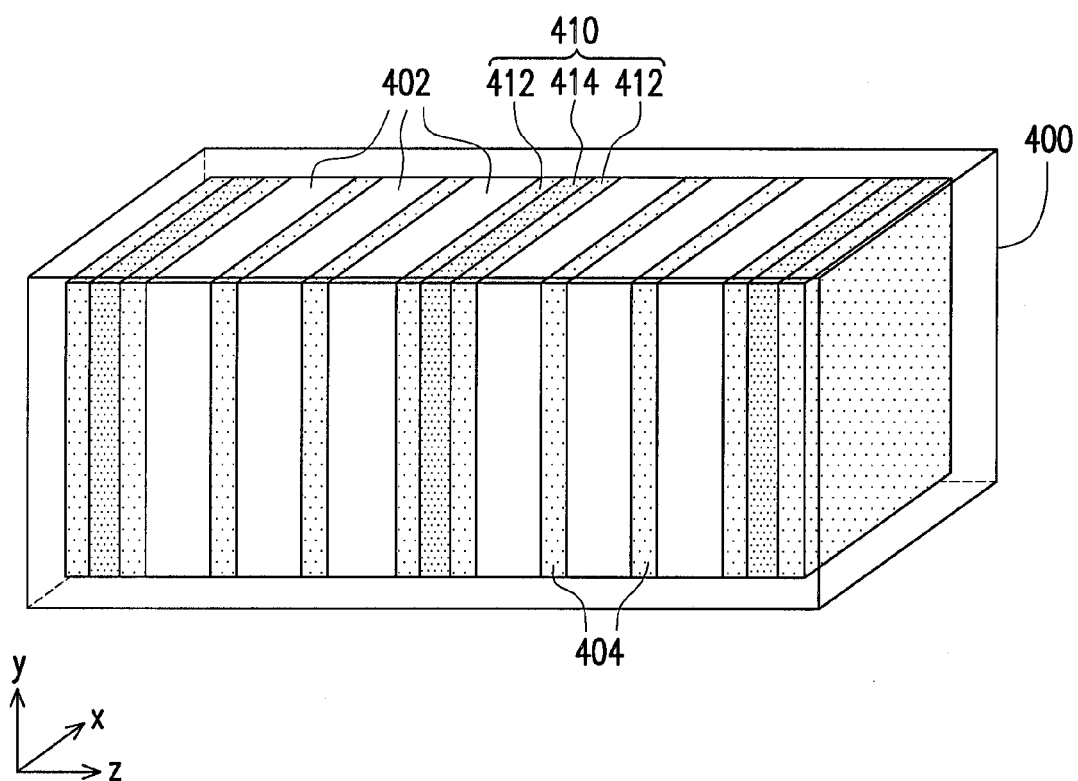
FIG. 4 is a 3D diagram illustrating a protection structure for thermal dissipation and preventing thermal runaway diffusion in a battery system according to a third exemplary embodiment.

FIG. 4 is a 3D diagram illustrating a protection structure for thermal dissipation and preventing thermal runaway diffusion in a battery system according to a third exemplary embodiment.

Referring to FIG. 4, the protection structure for preventing thermal runaway diffusion in the present exemplary embodiment includes a battery module casing 400 and a plurality of composite heat conduction plates 410 contacted with the battery module casing 400. A heat conduction plate 404 is installed between every two of a plurality of unit cells 402 in the battery module casing 400. Each side of each of the composite heat conduction plates 410 has three unit cells 402. In the third exemplary embodiment, the composite heat conduction plate 410 is a triple layer anisotropic heat conduction structure constituted by a layer of the heat insulation layer 414 sandwiched between two layers of the heat conduction layer 412. Moreover, the materials and thicknesses of the heat conduction layers 412 and the heat insulation layer 414 can be referred to the first embodiment. The fabrication of the composite heat conduction plate 410 is performed by adhering a layer of the heat insulation layer 414 to two layers of the heat conduction layer 412. Alternatively, a layer of the heat conduction layer 412 is coated on each side of a layer of the heat insulation layer 414. Generally, a battery with a thinner thickness (i.e. 0.5 cm) can adopt a double layer composite heat conduction plate (as shown in FIG. 3A). However, a battery with large size (i.e. a battery with a thickness greater than 1 cm) or having a plurality of unit cells 402 sandwiched therein requires a triple layer composite heat conduction plate 410 illustrated in the present exemplary embodiment to provide sufficient heat conduction and thermal dissipation. Moreover, the battery module casing 400 of the present exemplary embodiment can also include the heat dissipation fins 306 shown in FIG. 3B.

Figure 5:
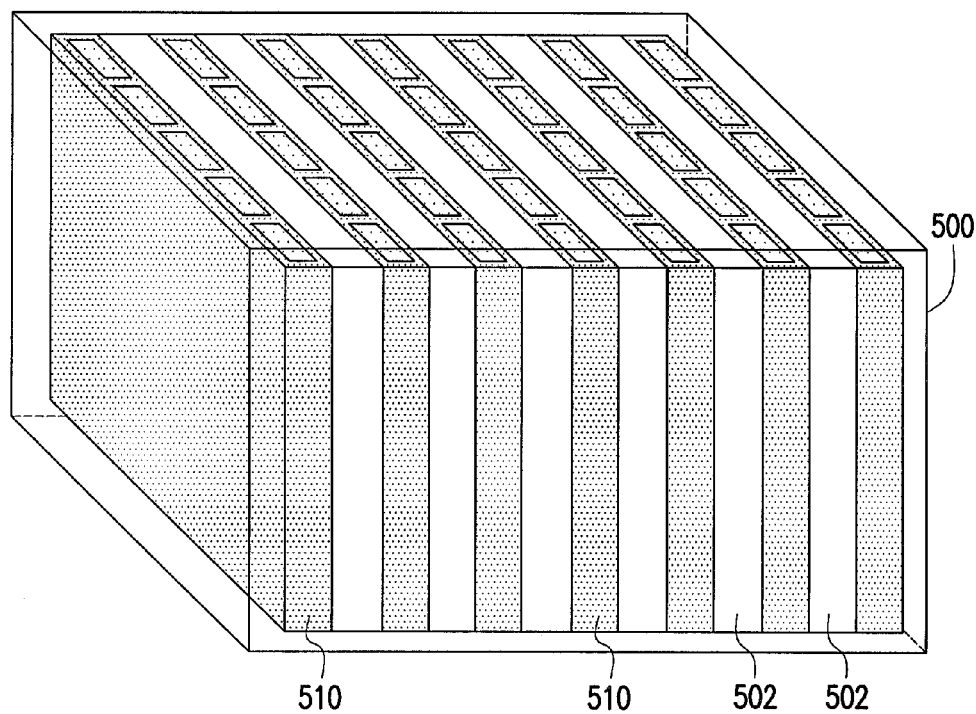
FIG. 5 is a 3D diagram illustrating a protection structure for thermal dissipation and preventing thermal runaway diffusion in a battery system according to a fourth exemplary embodiment.

FIG. 5 is a 3D diagram illustrating a protection structure for thermal dissipation and preventing thermal runaway diffusion in a battery system according to a fourth exemplary embodiment.

Referring to FIG. 5, the protection structure for preventing thermal runaway diffusion in the present exemplary embodiment includes a battery module casing 500 and a plurality of composite heat conduction plates 510 contacted with the battery module casing 500. Each of the composite heat conduction plates 510 is sandwiched between two of a plurality of unit cells 502. The structure thereof is identical to that shown in the first exemplary embodiment; however, the two structures are different in the detailed structure of the composite heat conduction plates 510.

Figure 6:
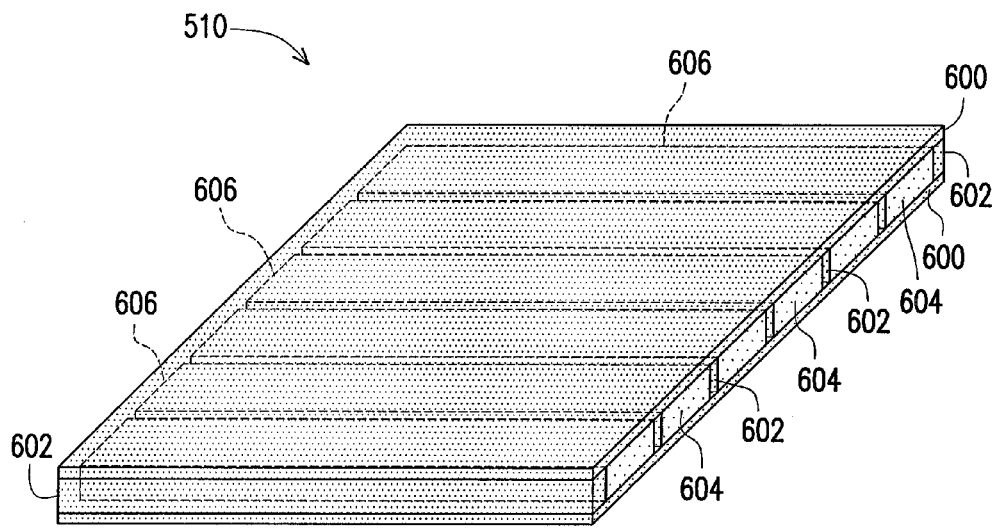
FIG. 6 is a 3D diagram illustrating a composite heat conduction plate shown in FIG. 5.

FIG. 6 is a 3D diagram illustrating the composite heat conduction plate 510 shown in FIG. 5. In the fourth exemplary embodiment, each of the composite heat conduction plates 510 includes two layers of a heat conduction layer 600, a plurality of structural supports disposed between the heat conduction layers 600, and a plurality of heat insulation layers 604. The structural supports 602 are utilized to support the heat conduction layers 600 and form a plurality of internal spaces 606 and the heat insulation layer 604 is filled into the internal spaces 606. Herein, the structural supports 602 can be linear strips as depicted in FIG. 6 or structures of other types, such as trellis strips, square dot structures, diamond dot structures, or circular dot structures so as to maintain structural strength and enforce the stability of the composite heat conduction plates 516. For the fabrication of the composite heat conduction plates 510, a structure having the top and the bottom heat conduction layers 600 and the structural supports disposed therebetween can be fabricated or assembled through casting, extrusion, injection, or other suitable methods, and the heat insulation layers 604 are perfused and formed inside.

Further, when a casing of the unit cell 502 (not shown) is fabricated with a metal material having high conductivity (i.e. aluminum, aluminum alloy, and so on), the heat conduction layers 600 can be replaced by the casings of the unit cells 502 directly. The structural supports 602 are also adopted as the structural support for the internal perfusion of the heat insulation layers 604 and the fixing of the unit cells 502. The material used to fabricate the structural supports 602 is not limited to the materials listed in Table 1 or Table 2.

When the composite heat conduction plates 510 in FIG. 5 use a liquid (i.e. water) as the heat insulation layers 604, the composite heat conduction plates 510 adopt water having a thermal conductivity coefficient kz of about 0.58 W/m·K when thermal runaway does not occur. However, when thermal runaway occurs in one of the unit cells 502, water in the composite heat conduction plates 510 evaporates to vapor with the increase of temperature, and the vapor after evaporation has a thermal conductivity coefficient k only ⅕ of that of water. Consequently, the composite heat conduction plates 510 in FIG. 5 can insulate heat more effectively. In addition, the heat insulation layer 604 can also be filled with a material which remains in solid state under room temperature, such as petrolatum or fatty acids. Thus, when thermal runaway occurs in one of the unit cells, the high temperature causes petrolatum or fatty acids to melt. A thermal conductivity coefficient k thereof is then reduced to enhance the heat insulation. The battery module casing 500 of the present exemplary embodiment can further include the heat dissipation fins 306 shown in FIG. 3B.

Figure 7A:
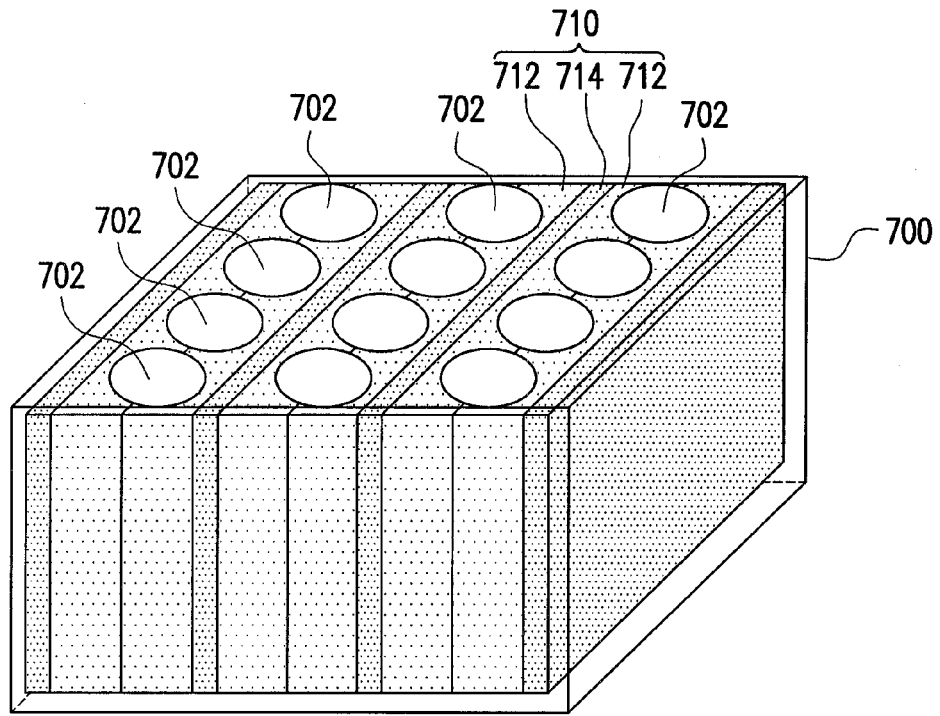
FIGS. 7A and 7B are 3D diagrams respectively illustrating a protection structure for thermal dissipation and preventing thermal runaway diffusion in a battery system according to a fifth exemplary embodiment.
Figure 7B:
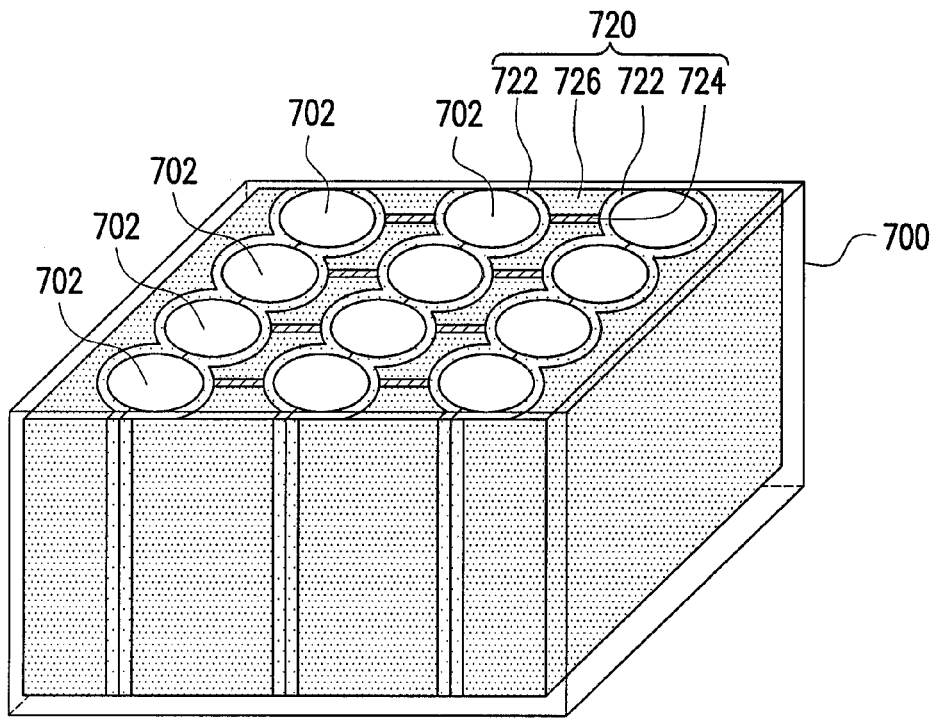

FIGS. 7A and 7B are 3D diagrams respectively illustrating a protection structure for thermal dissipation and preventing thermal runaway diffusion in a battery system according to a fifth exemplary embodiment.

Referring to FIG. 7A, the protection structure for preventing thermal runaway diffusion in the present exemplary embodiment includes a battery module casing 700 and a plurality of composite heat conduction plates 710 contacted with the battery module casing 700. A plurality of unit cells 702 in the battery module casing 700 has a cylindrical shape. In the present exemplary embodiment, four unit cells 702 are aligned in a row. Therefore, each of the composite heat conduction plates 710 of FIG. 7A is located between two rows of the unit cells 702. Nevertheless, the number of unit cells in one row can be adjusted according to the actual implementation and is not limited to the drawing. The structure of the composite heat conduction plates 710 is similar to those in the third exemplary embodiment. The composite heat conduction plate 710 is a triple layer structure constituted by a layer of the heat insulation layer 714 sandwiched between two layers of the heat conduction layer 712. Moreover, the materials and thicknesses of the heat conduction layers 712 and the heat insulation layer 714 can be referred to the first embodiment.

To match the shape of the unit cells 702, the heat conduction layer 712 is fabricated to include cylindrical through holes capable of accommodating the unit cells 702 by casting. Additionally, materials such as heat dissipation grease can be adopted to enhance the thermal transmission between the unit cells 702 and the heat conduction layers 712. The battery module casing 700 of the present exemplary embodiment can also include the heat dissipation fins 306 shown in FIG. 3B.

Further, when a casing of the unit cell 702 (not shown) is fabricated with a metal material having high conductivity (i.e. aluminum, aluminum alloy, and so on), the heat conduction layers of the composite heat conduction plate 710 can be replaced by the casings of the unit cells 702 directly. Structures marked with 712 in FIG. 7A are merely used as structural supports for fixing the unit cells 702, and these structures are not limited to the materials illustrated in Table 1 or Table 2.

Referring to FIG. 7B, FIGS. 7B and 7A are different in the structure of a composite heat conduction plate 720. Each of a plurality of heat conduction layers 722 in the composite heat conduction plate 720 in FIG. 7B is a layer formed according to the shape of the unit cells. Moreover, a plurality of structural supports 724 is disposed therein and a heat insulation layer 726 is filled into a plurality of spaces between the heat conduction layers 722.

As illustrated in FIG. 7A, when the casing of the unit cell 702 (not shown) is fabricated with a metal material having high conductivity (i.e. aluminum, aluminum alloy, and so on), the heat conduction layers of the composite heat conduction plate 710 can be replaced by the casings of the unit cells 702 directly. Structures marked with 722 in FIG. 7B are merely used as structural supports for the internal perfusion of the heat insulation layer 726 and the fixing of the unit cells 702, and these structures are not limited to the materials illustrated in Table 1 or Table 2.

The following simulation examples and comparative examples are provided to validate the effects of the exemplary embodiments aforementioned.

Simulation Example 1

Figure 8:
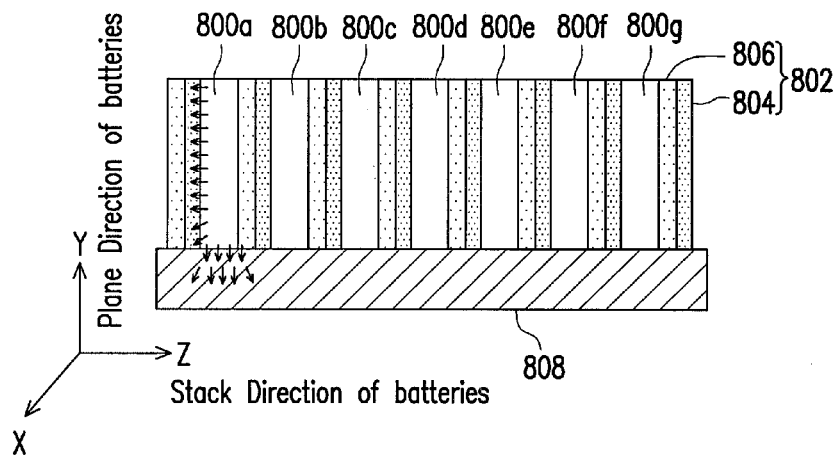
FIG. 8 is a diagram illustrating a battery module structure in a simulation example 1.

A structure similar to that illustrated in the first exemplary embodiment (i.e. FIG. 8) has a rectangular lithium battery as an example to simulate the performance of a battery module, which is constituted by lithium batteries 800a-800g, in protecting the thermal runaway diffusion of the single lithium battery 800a after a composite heat conduction plate 802 is disposed for heat conduction and heat insulation.

For the conventional lithium batteries, a self-heating thermal runaway reaction initiation temperature (that is, SEI) and an initiation decomposition temperature thereof are about 80° C. to 90° C., and a thermal runaway threshold temperature of the unit cells is about 150° C.

In the present example, a thickness of each of the lithium batteries 800a-800g is 0.5 cm (a thickness widely adopted in conventional rectangular aluminum foil packaged batteries) and the simulated batteries 800a-800g have a surface area of 10 cm×13 cm and are simulated with a height of 13 cm. The simulated composite heat conduction plate 802 is a double layer structure constituted by a layer of a heat conduction layer 804 and a layer of a heat insulation layer 806. The heat conduction layer 804 is fabricated with an aluminum material having high conductivity, a thickness of 0.1 cm, and a thermal conductivity coefficient of 237 W/m·K. The heat insulation layer 806 is fabricated with a polymer material having a thickness of 0.1 cm and a thermal conductivity coefficient of 0.2 W/m·K.

The composite heat conduction plate 802 constituted by the heat conduction layer 804 and the heat insulation layer 806 has an anisotropic thermal conduction. That is, a thermal conduction coefficient kxy of the composite heat conduction plate 802 in a plane direction is larger than a thermal conduction coefficient kz in a thickness direction (that is, a direction of the battery heat insulation), such that heat is effectively limited to conduct in an x direction and a y direction and does not conduct to the neighboring batteries in a z direction. From this example, the equivalent thermal conductivity coefficients kxy and kz of the composite heat conduction plate 802 can be obtained from the following equations.

$$kz = \frac{L_1 + L_2}{(L_1/k_1) + (L_2/k_2)}$$

$$kxy = \frac{A_1}{A_1 + A_2}k_1 + \frac{A_2}{A_1 + A_2}k_2$$

In the equation above, $L_1$ is a thickness of the heat conduction layer 804, $L_2$ is a thickness of the heat insulation layer 806, $k_1$ is a thermal conductivity coefficient of the heat conduction layer 804, $k_2$ is a thermal conductivity coefficient of the heat insulation layer 806, $A_1$ is a cross-sectional area in a heat conduction direction of the heat conduction layer 804, and $A_2$ is a cross-sectional area in a heat conduction direction of the heat insulation layer 806.

In other words, the equivalent thermal conductivity coefficients kxy and kz of the composite heat conduction plate 802 can be adjusted according to the choice of material and the setting of thickness. The thicknesses of the heat conduction layer and the heat insulation layer in the composite heat conduction plate 802 are 50% respectively. Anisotropic thermal conductivity coefficients kz and kxy can be calculated through the equations aforementioned. Here, kz=0.4 W/m·K, kxy=118.6 W/m·K, and the value of kxy in the present example is 300 times of the value of kz.

Figure 9:
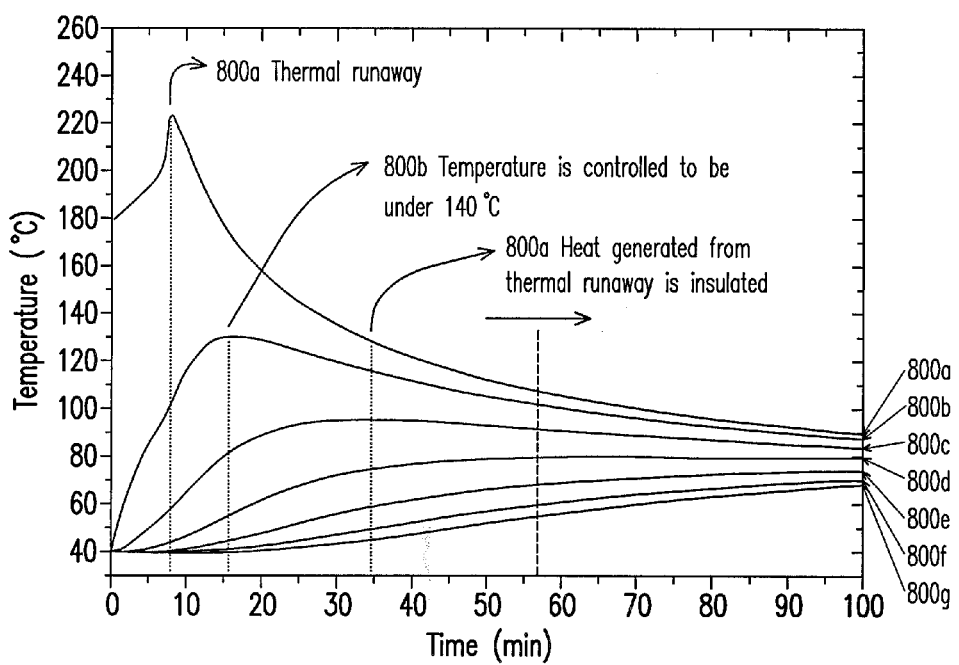
FIG. 9 is a curve diagram of temperature versus time of a unit cell in the simulation example 1.

Referring to FIG. 9, when thermal runaway occurs to the lithium battery 800a, the lithium battery 800a then releases a large amount of heat due to the thermal decomposition of internal material in the battery. FIG. 9 illustrates a relationship of the temperature of all of the lithium batteries 800a-800g versus time. Herein, when a composite heat conduction plate 802 having heat conduction/heat insulation function is added, most of the heat from the lithium battery 800a is transmitted to a battery module casing 808 for heat dissipation along directions pointed by arrows shown in FIG. 8. Moreover, the heat does not diffuse so as to affect the lithium battery 800b. The thermal runaway of a single unit cell in the battery module is then well heat dissipated and insulated, such that the safety of the entire battery module is ensured.

Simulation Example 2

Figure 10:
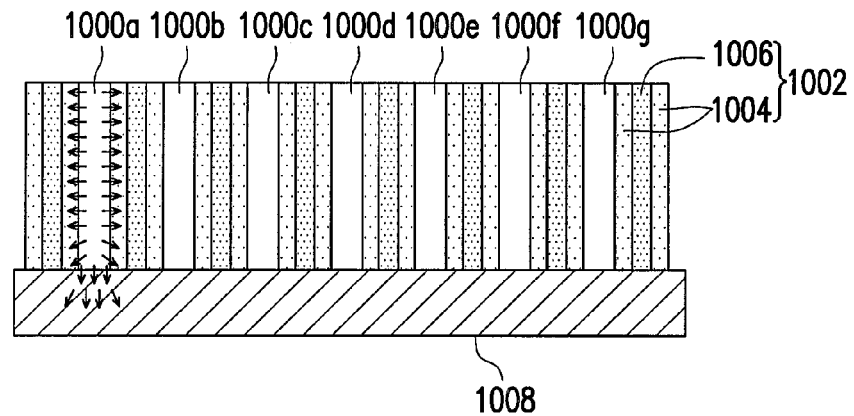
FIG. 10 is a diagram illustrating a battery module structure in a simulation example 2.

A structure similar to that illustrated in the third exemplary embodiment (i.e. FIG. 10) is simulated. The size of a plurality of lithium batteries 1000a-1000g is identical to that in the simulation example 1. A simulated composite heat conduction plate 1002 is a triple layer structure constituted by a layer of a heat insulation layer 1006 sandwiched between two layers of a heat conduction layer 1004. The materials, thicknesses, and thermal conductivity coefficients of each heat conduction layer 804 and the heat insulation layer 806 are identical to those described in the simulation example 1. In other words, a total thickness of the conduction layer is 0.2 cm and a thickness of the heat insulation layer is 0.1 cm. The heat conduction layers of the composite heat conduction plate 1002 occupy ⅔ of the thickness of the entire composite heat conduction plate 1002. The heat insulation layer occupies ½ of the thickness of the entire composite heat conduction plate 1002. From the equation shown in the simulation example 1, the composite heat conduction plate 1002 has anisotropic thermal conductivity coefficients kz and kxy of 0.6 W/m·K and 158.1 W/m·K respectively, and the value of kxy is 260 times of the value of kz in the present example.

Figure 11:
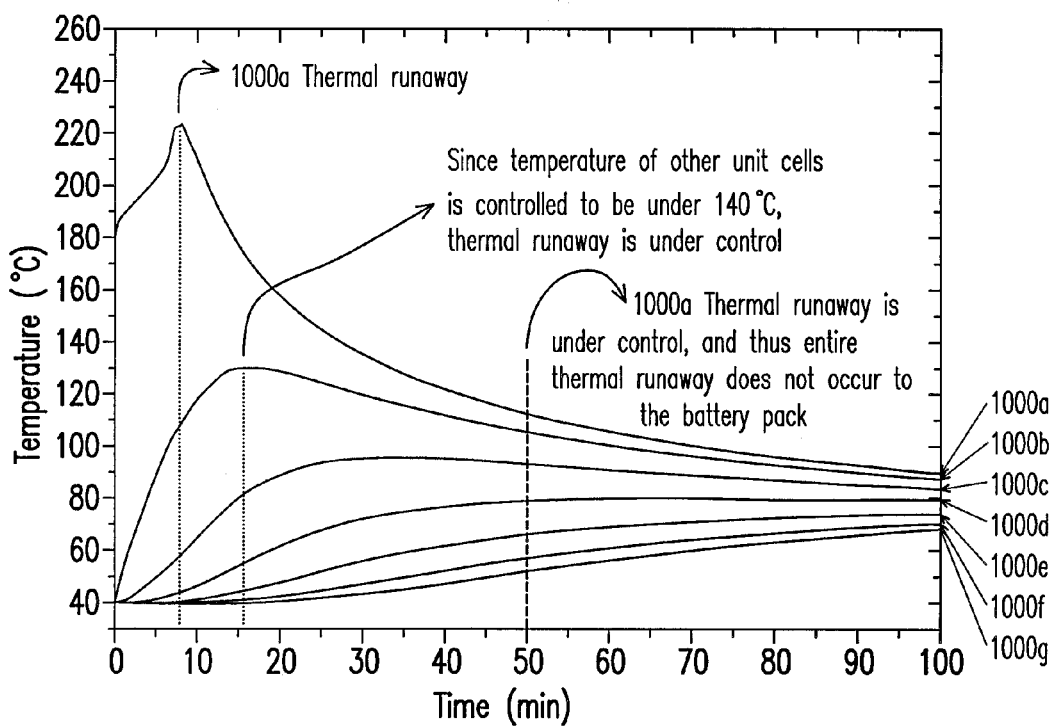
FIG. 11 is a curve diagram of temperature versus time of a unit cell in the simulation example 2.

When thermal runaway occurs in the lithium battery 1000a, the lithium battery 1000a then releases a large amount of heat due to the thermal decomposition of internal material, and the simulation result is presented in FIG. 11. As depicted in FIG. 11, the composite heat conduction plate 1002 effectively insulates the heat generated by the lithium battery 1000a and prevents the heat from transmitting to the lithium batteries 1000b-1000g. Moreover, the heat conduction layer 1004 is capable of transmitting the heat generated by the lithium battery 1000a to a battery module casing by following the arrows shown in FIG. 10 for heat dissipation. The heat insulation layer 1006 is capable of insulating the heat generated by the lithium battery 1000a and preventing the heat from transmitting to the lithium battery 1000b.

Comparative Example

Figure 12:
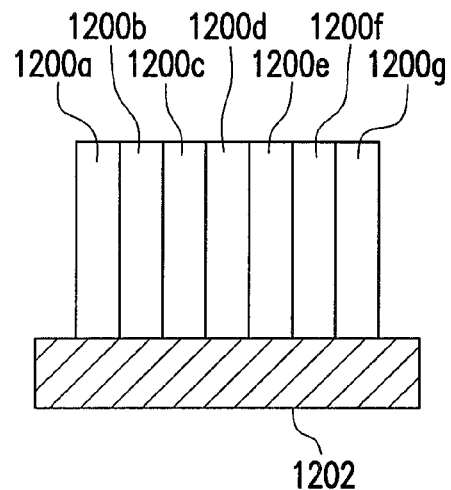
FIG. 12 is a diagram illustrating a battery module structure in a comparative example.

A structure lacking a composite heat conduction plate (i.e. FIG. 12) is simulated. The size of a plurality of lithium batteries 1200a-1200g is identical to that in the simulation example 1. The lithium batteries 1200a-1200g have no heat conduction or heat insulation material therebetween. In other words, the lithium batteries 1200a-1200g are stacked tightly to form a battery module, and this is also the most widely adopted stacking method for conventional battery packs.

Figure 13:
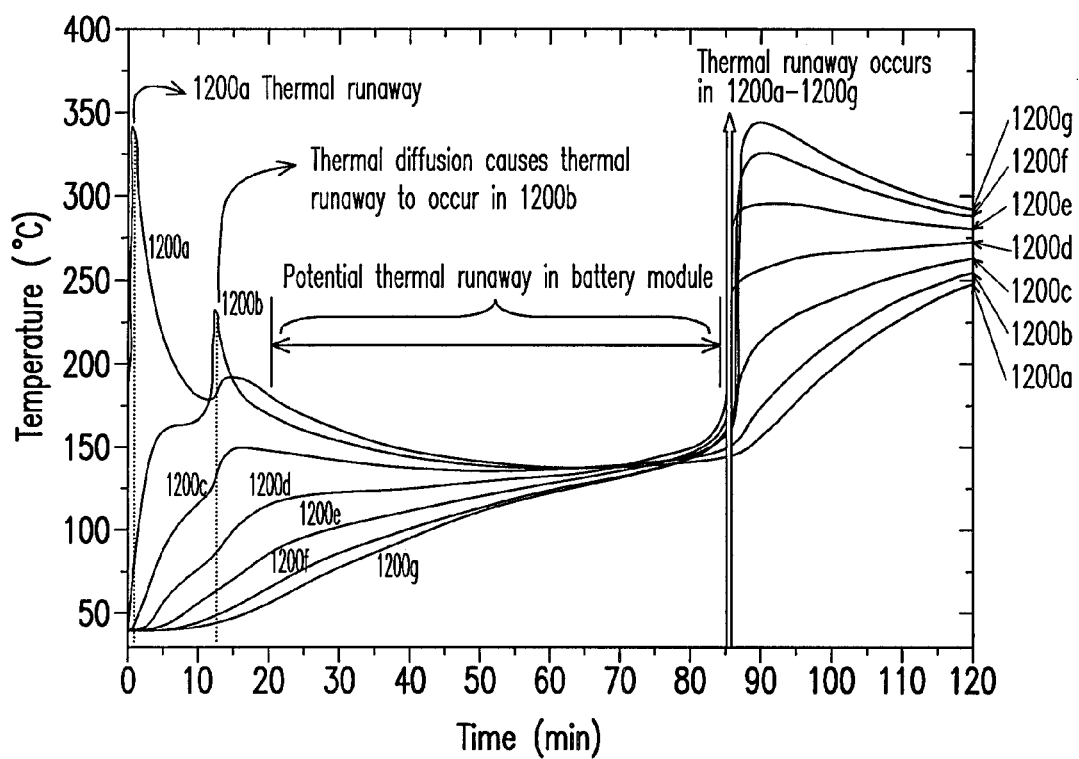
FIG. 13 is a curve diagram of temperature versus time of a unit cell in the comparative example.

When thermal runaway occurs in the lithium battery 1200a, a simulation result as shown in FIG. 13 then results. As shown in FIG. 13, an initiation thermal runaway temperature of the lithium battery 1200a is about 180° C. and the temperature of the lithium battery 1200a rapidly increases to about 350° C. due to the heat released from the degradation of internal material in a short time (about 2 minutes). The heat of the lithium battery 1200a gradually transmits to the neighboring lithium battery 1200b, such that thermal runaway also occurs in the lithium battery 1200b. Thereafter, the heat generated from the lithium batteries 1200a and 1200b gradually heats up the other lithium batteries inside the battery module, so that thermal runaway occurs to the entire battery module.

In the comparative example, the lithium batteries 1200a and 1200b needs a period of time to heat up the other lithium batteries 1200c-1200g. Once thermal runaway occurs in the entire battery module, the temperature of the battery module then increases rapidly which results in the ignition and explosion of the whole battery module, and the hazardousness thereof is far higher than the thermal runaway of a single unit cell. When the size of the unit cells increases (larger than the simulation conditions provided above), the heat transmitted from inside of the battery module to a battery module casing 1202 has poorer heat dissipation, such that the thermal runaway diffusion of the unit cells becomes more severe.

Thus, from the simulation illustrated above, in the protection structure for thermal dissipation and preventing thermal runaway diffusion in the battery system of the disclosure, thermal dissipation and thermal runaway diffusion insulation are attained when kxy>30 times of kz, and superior thermal dissipation and thermal runaway diffusion insulation are attained when kxy>100 times of kz.

Figure 14:
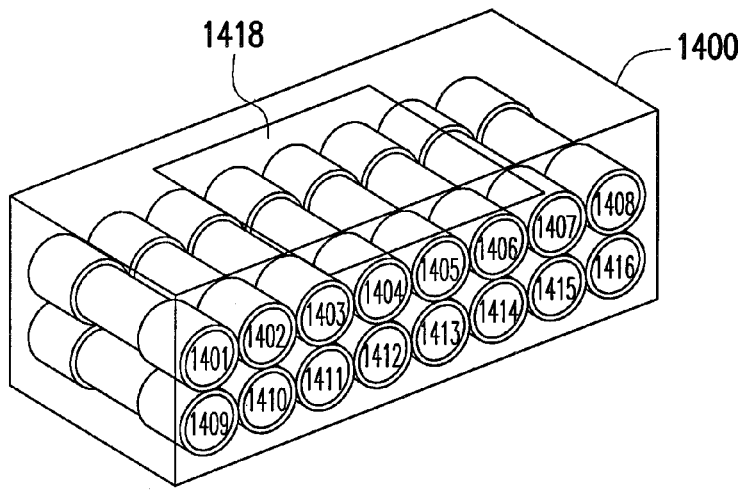
FIG. 14 is a 3D diagram illustrating an installation of a battery module of a control circuit board in a battery module casing.

In some of the battery modules, a control circuit board 1418 is installed in a battery module casing 1400 including a plurality of unit cells 1401-1416 as shown in FIG. 14. A resistance, a transistor and a conductive circuit (not shown) on the control circuit board 1418 generate heat in the charging/discharging process. The heat from the control circuit board 1418 heats up the unit cells 1401-1416, so that a temperature of the unit cells 1403-1406 neighboring to the control circuit board 1418 is higher than an average temperature of the unit cells.

Figure 15:
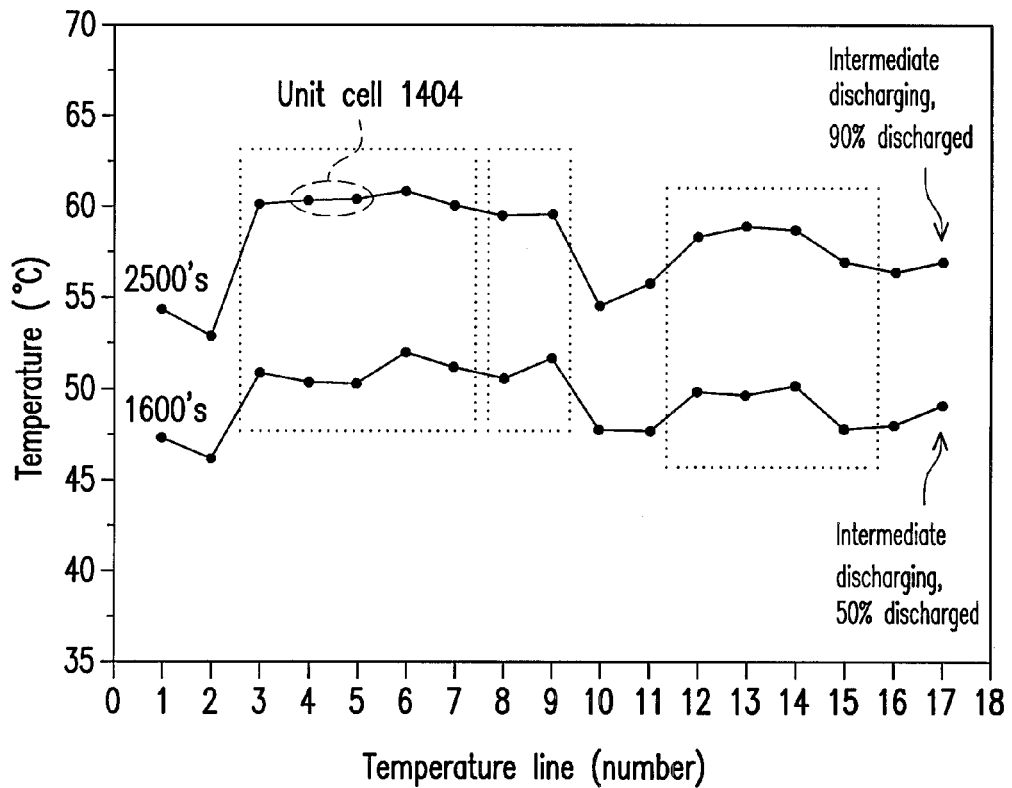
FIG. 15 is a curve diagram of a unit cell in FIG. 14 versus temperature.

In an actual measurement, the temperature of the unit cells 1403-1406 is 5° C. to 10° C. higher than a temperature of the unit cells 1401, 1402, 1409, 1410 which are farther away from the control circuit board 1418 as shown in FIG. 15. In FIG. 15, a reference table of the temperature lines and the numbers of the unit cells is shown in Table 3. Herein, temperature lines 4 and 5 correspond to a temperature measured above (close to the control circuit board 1418) and below the unit cell 1404 respectively.

TABLE 3

| Temperature line | Number of unit cell | Temperature line | Number of unit cell |
|---|---|---|---|
| 1 | 1401 | 10 | 1409 |
| 2 | 1402 | 11 | 1410 |
| 3 | 1403 | 12 | 1411 |
| 4 | above 1404 | 13 | 1412 |
| 5 | Below 1404 | 14 | 1413 |
| 6 | 1405 | 15 | 1414 |
| 7 | 1406 | 16 | 1415 |
| 8 | 1407 | 17 | 1416 |
| 9 | 1408 | | |

As shown in FIG. 15, the temperatures of the unit cells 1403-1406 located below the control circuit board 1418 are 5° C. higher than those of the unit cells 1401-1402. The temperatures of a plurality of unit cells 1411-1413 located two layers below the control circuit board 1418 are also slightly higher than those of the other unit cells. In addition, the temperatures of the unit cells 1407 and 1408 are slightly higher than those of the other unit cells as depicted in FIG. 15. This is due to the fact that an external current connection circuit is located nearby, so that the heat of the circuit is transmitted to the unit cells 1407 and 1408.

Figure 16:
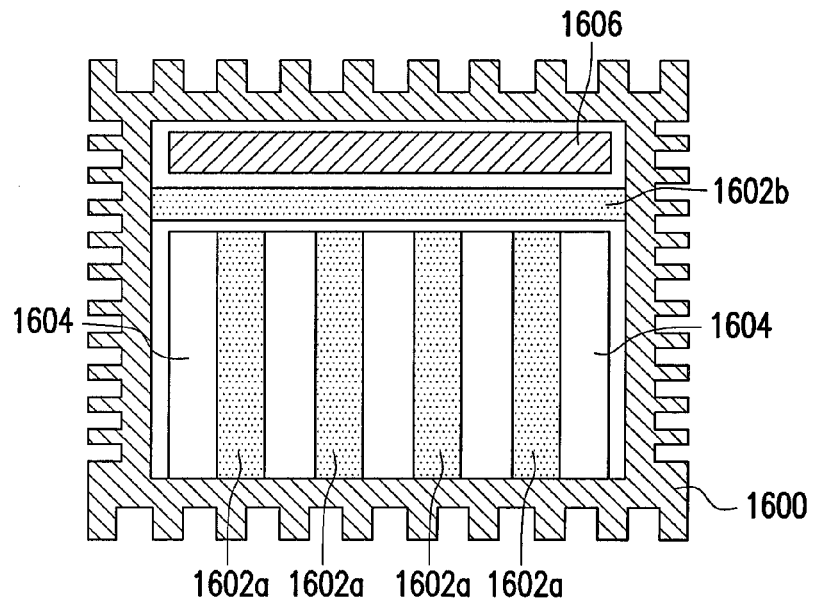
FIGS. 16 and 17 are 3D diagrams respectively illustrating a protection structure for thermal dissipation and preventing thermal runaway diffusion in a battery system according to a sixth exemplary embodiment.
Figure 17:
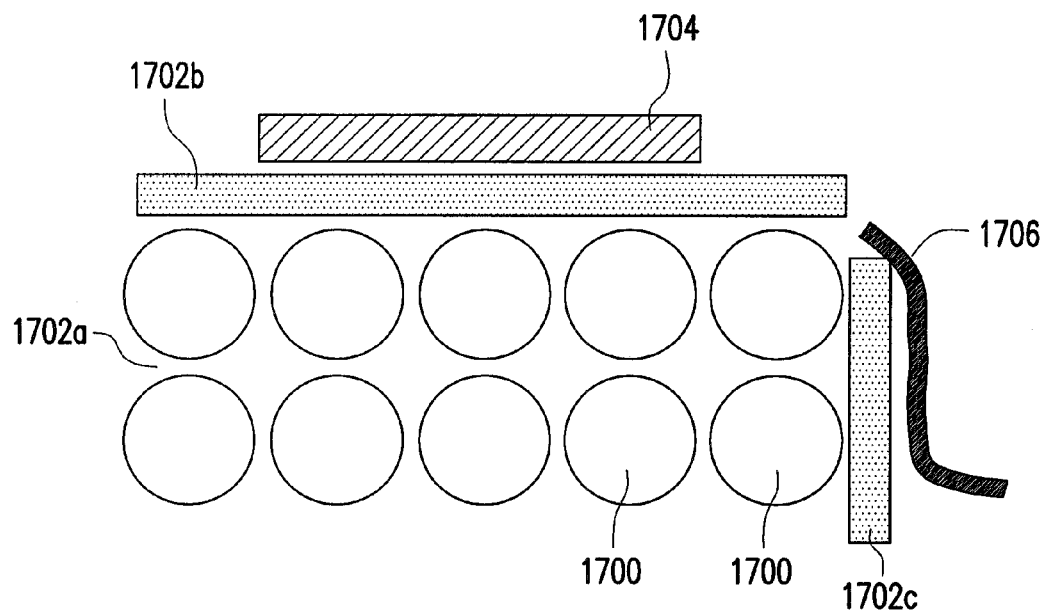

The composite heat conduction plate of the disclosure can further be disposed between the control circuit plate and the unit cells and between the circuit and the unit cells as shown in FIGS. 16 and 17 respectively. FIGS. 16 and 17 are 3D diagrams illustrating a protection structure for thermal dissipation and preventing thermal runaway diffusion in a battery system according to a sixth exemplary embodiment.

Referring to FIG. 16, the protection structure for preventing thermal runaway diffusion in the present exemplary embodiment includes a battery module casing 1600 constituted by a plurality of heat dissipation fins and a plurality of composite heat conduction plates 1602a, 1602b contacted with the battery module casing 1600. Moreover, the composite heat conduction plates 1602a, 1602b can have different structural designs according to the shape of the unit cell 1604, and the details can be referred to the exemplary embodiments aforementioned. For the simplification of the drawings, the composite heat conduction plates 1602a located between the unit cells 1604 and the composite heat conduction plate 1602b located between the unit cells 1604 and the control circuit board 1606 are merely denoted with notations 1602a and 1602b in FIG. 16. A heat conduction layer (not shown) of the composite heat conduction plate 1602b in the present exemplary embodiment is disposed on the side of the control circuit board 1606 and a heat insulation layer (not shown) is disposed on the side of the unit cells 1604. Thus, the heat from the control circuit board 1606 can be transmitted to the battery module casing 1600 for heat dissipation through the composite heat conduction plate 1602b with anisotropic heat conduction property. Moreover, the heat from the control circuit board 1606 is insulated from transmitting to and therefore heating up the unit cells 1604 so as to prevent the unit cells 1604 neighboring to the control circuit board 1606 from rapid deterioration and thereby affecting the overall life-span of the battery module.

Referring to FIG. 17, a structure inside the battery module casing is illustrated. Furthermore, a plurality of unit cells 1700 has a cylindrical shape. Thus, a composite heat conduction plate 1702a located between the unit cells 1700 can be referred to FIG. 7A or 7B. Composite heat conduction plates at different locations are merely denoted with 1702a, 1702b, and 1702c in FIG. 17. Herein, the composite heat conduction plate 1702a is located between the unit cells 1700, the composite heat conduction plate 1702b is located between the unit cells 1700 and a control circuit board 1704, and the composite heat conduction plate 1702c is located between the unit cells 1700 and a circuit 1706. Heat conduction layers (not shown) of the composite heat conduction plates 1702b and 1702c are respectively disposed on the side of the control circuit board 1704 and the circuit 1706 that are releasing heat. The heat insulation layers (not shown) of the composite heat conduction plates 1702b and 1702c are disposed on the side of the unit cells 1700.

The above exemplary embodiments illustrate a protection structure for thermal dissipation and preventing thermal runaway diffusion inside a battery module in a battery system. However, the disclosure can also be applied in a battery pack inside a battery system as shown in a seventh exemplary embodiment of the disclosure.

Figure 18:
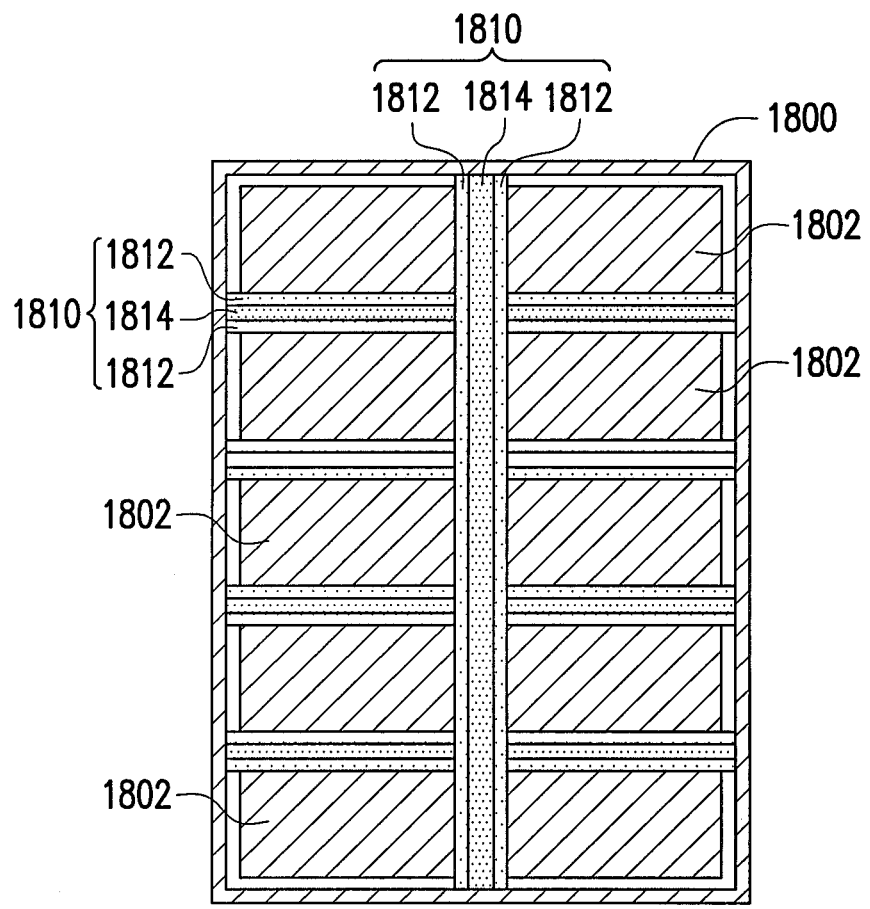
FIG. 18 is a top view illustrating a protection structure for thermal dissipation and preventing thermal runaway diffusion in a battery system according to a seventh exemplary embodiment.

In FIG. 18, a protection structure for preventing thermal runaway diffusion includes a battery pack casing 1800 and at least one composite heat conduction plate 1810. A plurality of battery modules 1802 is disposed in the battery pack casing 1800. The battery modules 1802 can be selected from one or multiple of the battery modules described in FIGS. 2-7B and FIGS. 16-17. The battery pack casing 1800 can also include heat dissipation fins 306 as depicted in FIG. 3. Each of the composite heat conduction plates 1810 is located in the battery pack casing 1800, contacted with the battery pack casing 1800, and sandwiched between at least two of the battery module 1802. A structure of the composite heat conduction plate 1810 is a triple layer anisotropic heat conduction structure constituted by a layer of a heat insulation layer 1814 sandwiched between two layers of a heat conduction layer 1812 (as described in the third exemplary embodiment). Alternatively, the composite heat conduction plates illustrated in the first, the second, the fourth, or the fifth exemplary embodiment can also be selected according to demands, and the details are thus omitted hereinafter. In some of the battery packs, components releasing heat such as control circuit boards, circuits, and so on are installed in the battery pack casing 1800 having the battery modules 1802. As a consequence, the composite heat conduction plate 1810 can be further disposed between the battery modules 1802 and the heat releasing components.

Further, when a casing of the unit cell 1802 (not shown) is fabricated with a metal material having high conductivity (i.e. aluminum, aluminum alloy, and so on), the heat conduction layers of the composite heat conduction plate 1810 can be replaced by the casings of the unit cells 1802 directly. Structures marked with 1812 in FIG. 18 are merely used as structural supports for fixing the unit cells 1802, and these structures are not limited to the materials illustrated in Table 1 or Table 2.

In summary, by disposing the composite heat conduction plate between the unit cells and/or the battery modules, the thermal runaway in the battery module or the battery pack can be controlled and prevented. As a result, the thermal runaway caused by a single unit cell due to short-circuit or overcharging is limited to that single unit cell or a few number of unit cells, so that the heat released during the thermal runaway is transmitted with a specific directionality. Majority of the heat is directly transmitted to the heat dissipation fins of the casing for thermal dissipation to prevent the heat from transmitting to the neighboring unit cells which may then lead to thermal runaway of the neighboring unit cells, such that thermal runaway is prevented from occurring in the entire battery module. The composite heat conduction plate of the disclosure further includes a heat conduction/heat dissipation property and can solve the heat dissipation and temperature gradient problem in the battery system so as to elongate the cycle life of the battery pack.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A protection structure configured to thermal dissipation and prevent thermal runaway diffusion in a battery system, the protection structure comprising:
   a battery module casing disposed with a plurality of unit cells; and
   at least one composite heat conduction plate, located within the battery module casing, contacted with the battery module casing, and sandwiched between at least two of the unit cells, wherein the composite heat conduction plate is a multilayer anisotropic heat conduction structure, and the composite heat conduction plate comprises:
   two layers of the heat conduction layer;
   a plurality of structural supports disposed between the heat conduction layers to support the heat conduction layers and form a plurality of internal spaces; and
   a heat insulation material filled in the internal spaces as the heat insulation layer.

2. The protection structure configured to thermal dissipation and prevent thermal runaway diffusion in the battery system as claimed in claim 1, wherein the structural supports comprise linear strips, trellis strips, square dot structures, diamond dot structures, or circular dot structures.

3. The protection structure configured to thermal dissipation and prevent thermal runaway diffusion in the battery system as claimed in claim 1, wherein the heat conduction layer is a casing of the unit cells.

4. The protection structure configured to thermal dissipation and prevent thermal runaway diffusion in the battery system as claimed in claim 1, wherein a thermal conductivity coefficient k of the heat conduction layer is at least 50 W/m·K.

5. The protection structure configured to thermal dissipation and prevent thermal runaway diffusion in the battery system as claimed in claim 4, wherein a material of the heat conduction layer comprises gold, silver, aluminum, an aluminum alloy, copper, a copper alloy, magnesium, a magnesium alloy, a metal oxide, or a composite material having one of the above materials mixed with a plastic material.

6. The protection structure configured to thermal dissipation and prevent thermal runaway diffusion in the battery system as claimed in claim 4, wherein a material of the heat conduction layer comprises a composite material having high heat conduction ceramic powder mixed with a plastic material.

7. The protection structure configured to thermal dissipation and prevent thermal runaway diffusion in the battery system as claimed in claim 1, wherein a thermal conductivity coefficient k of the heat insulation layer is at most 2 W/m·K.

8. The protection structure configured to thermal dissipation and prevent thermal runaway diffusion in the battery system as claimed in claim 7, wherein the heat insulation layer comprises a foaming polymer material.

9. The protection structure configured to thermal dissipation and prevent thermal runaway diffusion in the battery system as claimed in claim 7, wherein the heat insulation layer comprises a low melting point polymer material having a melting point ranging from 40° C. to 80° C., a liquid, or air.

10. The protection structure configured to thermal dissipation and prevent thermal runaway diffusion in the battery system as claimed in claim 1, wherein a total thickness of the composite heat conduction plate ranges from 2.0 cm to 0.05 cm, a thickness of the heat conduction layer occupies 3% to 70% of the total thickness, and a thickness of the heat insulation layer occupies 30% to 97% of the total thickness.

11. The protection structure configured to thermal dissipation and prevent thermal runaway diffusion in the battery system as claimed in claim 1, wherein a total thickness of the composite heat conduction plate ranges from 1.0 cm to 0.05 cm, a thickness of the heat conduction layer occupies 5% to 70% of the total thickness, and a thickness of the heat insulation layer occupies 30% to 95% of the total thickness.

12. The protection structure configured to thermal dissipation and prevent thermal runaway diffusion in the battery system as claimed in claim 1, wherein a total thickness of the composite heat conduction plate ranges from 0.5 cm to 0.05 cm, a thickness of the heat conduction layer occupies 10% to 70% of the total thickness, and a thickness of the heat insulation layer occupies 30% to 90% of the total thickness.

13. The protection structure configured to thermal dissipation and prevent thermal runaway diffusion in the battery system as claimed in claim 1, wherein the battery module casing comprises a heat dissipation fin.

14. The protection structure configured to thermal dissipation and prevent thermal runaway diffusion in the battery system as claimed in claim 13, wherein the composite heat conduction plate and the heat dissipation fin are connected to each other through a physical or a soldering bonding method.

15. The protection structure configured to thermal dissipation and prevent thermal runaway diffusion in the battery system as claimed in claim 1, further comprising:
a control circuit board disposed within the battery module casing; and
the composite heat conduction plate being disposed between the control circuit board and the unit cells.

16. The protection structure configured to thermal dissipation and prevent thermal runaway diffusion in the battery system as claimed in claim 1, further comprising:
a circuit disposed within the battery module casing; and
the composite heat conduction plate being disposed between the circuit and the unit cells.

17. A protection structure configured to thermal dissipation and prevent thermal runaway diffusion in a battery system, the protection structure comprising:
a battery pack casing disposed with a plurality of battery modules; and
at least one composite heat conduction plate, located within the battery pack casing, contacted with the battery pack casing, and sandwiched between at least two of the battery modules, wherein the composite heat conduction plate is a multilayer anisotropic heat conduction structure, and the composite heat conduction plate comprises:
two layers of the heat conduction layer;
a plurality of structural supports disposed between the heat conduction layers to support the heat conduction layers and form a plurality of internal spaces; and
a heat insulation material filled in the internal spaces as the heat insulation layer.

18. The protection structure configured to thermal dissipation and prevent thermal runaway diffusion in the battery system as claimed in claim 17, wherein the structural supports comprise linear strips, trellis strips, square dot structures, diamond dot structures, or circular dot structures.

19. The protection structure configured to thermal dissipation and prevent thermal runaway diffusion in the battery system as claimed in claim 17, wherein the heat conduction layer is a casing of the battery modules.

20. The protection structure configured to thermal dissipation and prevent thermal runaway diffusion in the battery system as claimed in claim 17, wherein a thermal conductivity coefficient k of the heat conduction layer is at least 50 W/m·K.

21. The protection structure configured to thermal dissipation and prevent thermal runaway diffusion in the battery system as claimed in claim 20, wherein a material of the heat conduction layer comprises gold, silver, aluminum, an aluminum alloy, copper, a copper alloy, magnesium, a magnesium alloy, a metal oxide, or a composite material having one of the above materials mixed with a plastic material.

22. The protection structure configured to thermal dissipation and prevent thermal runaway diffusion in the battery system as claimed in claim 20, wherein a material of the heat conduction layer comprises a composite material having high heat conduction ceramic powder mixed with a plastic material.

23. The protection structure configured to thermal dissipation and prevent thermal runaway diffusion in the battery system as claimed in claim 17, wherein a thermal conductivity coefficient k of the heat insulation layer is at most 2 W/m·K.

24. The protection structure configured to thermal dissipation and prevent thermal runaway diffusion in the battery system as claimed in claim 23, wherein the heat insulation layer comprises a foaming polymer material.

25. The protection structure configured to thermal dissipation and prevent thermal runaway diffusion in the battery system as claimed in claim 23, wherein the heat insulation layer comprises a low melting point polymer material having a melting point ranging from 40° C. to 80° C., a liquid, or air.

26. The protection structure configured to thermal dissipation and prevent thermal runaway diffusion in the battery system as claimed in claim 17, wherein a total thickness of the composite heat conduction plate ranges from 2.0 cm to 0.05 cm, a thickness of the heat conduction layer occupies 3% to 70% of the total thickness, and a thickness of the heat insulation layer occupies 30% to 97% of the total thickness.

27. The protection structure configured to thermal dissipation and prevent thermal runaway diffusion in the battery system as claimed in claim 17, wherein a total thickness of the composite heat conduction plate ranges from 1.0 cm to 0.05 cm, a thickness of the heat conduction layer occupies 5% to 70% of the total thickness, and a thickness of the heat insulation layer occupies 30% to 95% of the total thickness.

28. The protection structure configured to thermal dissipation and prevent thermal runaway diffusion in the battery system as claimed in claim 17, wherein a total thickness of the composite heat conduction plate ranges from 0.5 cm to 0.05 cm, a thickness of the heat conduction layer occupies 10% to 70% of the total thickness, and a thickness of the heat insulation layer occupies 30% to 90% of the total thickness.

29. The protection structure configured to thermal dissipation and prevent thermal runaway diffusion in the battery system as claimed in claim 17, wherein the battery pack casing comprises a heat dissipation fin.

30. The protection structure configured to thermal dissipation and prevent thermal runaway diffusion in the battery system as claimed in claim 29, wherein the composite heat conduction plate and the heat dissipation fin are connected to each other through a physical or a soldering bonding method.

31. The protection structure configured to thermal dissipation and prevent thermal runaway diffusion in the battery system as claimed in claim 17, further comprising:
a control circuit board disposed within the battery pack casing; and
the composite heat conduction plate being disposed between the control circuit board and the battery modules.

32. The protection structure configured to thermal dissipation and prevent thermal runaway diffusion in the battery system as claimed in claim 17, further comprising:
a circuit disposed within the battery pack casing; and
the composite heat conduction plate being disposed between the circuit and the battery modules.

* * * * *